US007088387B1

(12) United States Patent
Freeman et al.

(10) Patent No.: US 7,088,387 B1
(45) Date of Patent: Aug. 8, 2006

(54) VIDEO RECORDING DEVICE RESPONSIVE TO TRIGGERING EVENT

(75) Inventors: William T. Freeman, Acton, MA (US); William S. Yerazunis, Acton, MA (US); Walter A. Hiatt, Waltham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 08/906,493

(22) Filed: Aug. 5, 1997

(51) Int. Cl.
*H04N 7/18* (2006.01)
(52) U.S. Cl. ..................................................... 348/155
(58) Field of Classification Search ................. 348/143, 348/148, 152–155; 386/109, 111–112, 117, 386/125–126; 360/5–6
See application file for complete search history.

(56) References Cited

U.S. PATENT DOCUMENTS

| | | | | |
|---|---|---|---|---|
| 4,281,354 A | | 7/1981 | Conte .............................. 360/5 |
| 4,789,904 A | | 12/1988 | Peterson ...................... 358/310 |
| 4,843,463 A | | 6/1989 | Michetti ....................... 358/108 |
| 4,910,591 A | | 3/1990 | Petrossian et al. ........... 358/103 |
| 5,016,633 A | * | 5/1991 | Chow ............................ 607/53 |
| 5,056,056 A | | 10/1991 | Gustin ......................... 364/900 |
| 5,109,278 A | * | 4/1992 | Erickson et al. ............. 348/153 |
| 5,111,291 A | * | 5/1992 | Erickson et al. ............. 348/152 |
| 5,121,200 A | | 6/1992 | Choi ............................ 358/103 |
| 5,446,659 A | * | 8/1995 | Yamawaki .................... 701/29 |
| 5,638,273 A | * | 6/1997 | Coiner et al. ................. 701/35 |
| 5,896,167 A | * | 4/1999 | Omae et al. ................. 348/149 |
| 5,915,069 A | * | 6/1999 | Nishijima .................... 386/112 |
| 5,982,418 A | * | 11/1999 | Ely .............................. 348/153 |
| 5,986,695 A | * | 11/1999 | Choi ............................ 348/155 |
| 5,996,023 A | * | 11/1999 | Winter et al. ............... 709/253 |
| 6,002,808 A | * | 12/1999 | Freeman ..................... 382/288 |
| 6,028,626 A | * | 2/2000 | Aviv ............................ 348/152 |
| 6,226,389 B1 | * | 5/2001 | Lemelson et al. .......... 382/104 |

* cited by examiner

*Primary Examiner*—Tung Vo
(74) *Attorney, Agent, or Firm*—Dirk Brinkman; Andrew J. Curtin

(57) ABSTRACT

A compact video image recording device for recording video images before and after a triggering event and which utilizes no moving parts is disclosed. The recording device includes at least one camera wherein each camera comprises a lens and a video image sensor. Each video image sensor generates an electronic signal representative of a video image impinging the respective sensor. The output of each image sensor is processed, compressed and generally employed to produce frame data which are successively stored in a successive frame locations of a semiconductor memory organized as a circular buffer memory. Upon the occurrence of a triggering event, a additional frames are stored in the buffer memory and further storage of frames then terminates. A video record is thus created of video images received both before and after the triggering event via a device which contains no moving parts and which can withstand substantial shock and vibration.

24 Claims, 7 Drawing Sheets

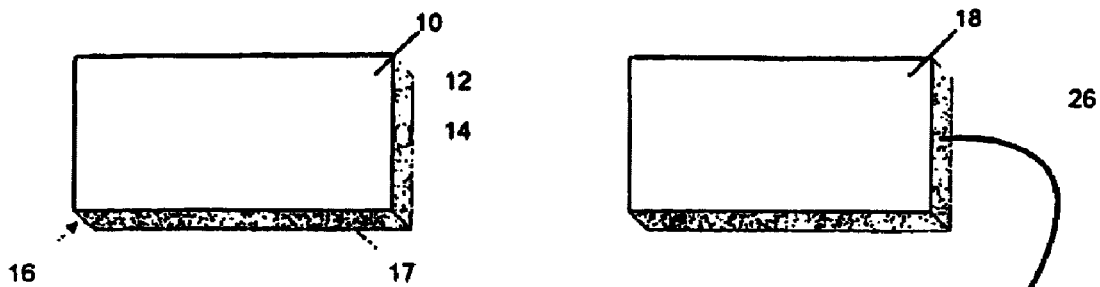
Fig. 2a  Fig. 2b
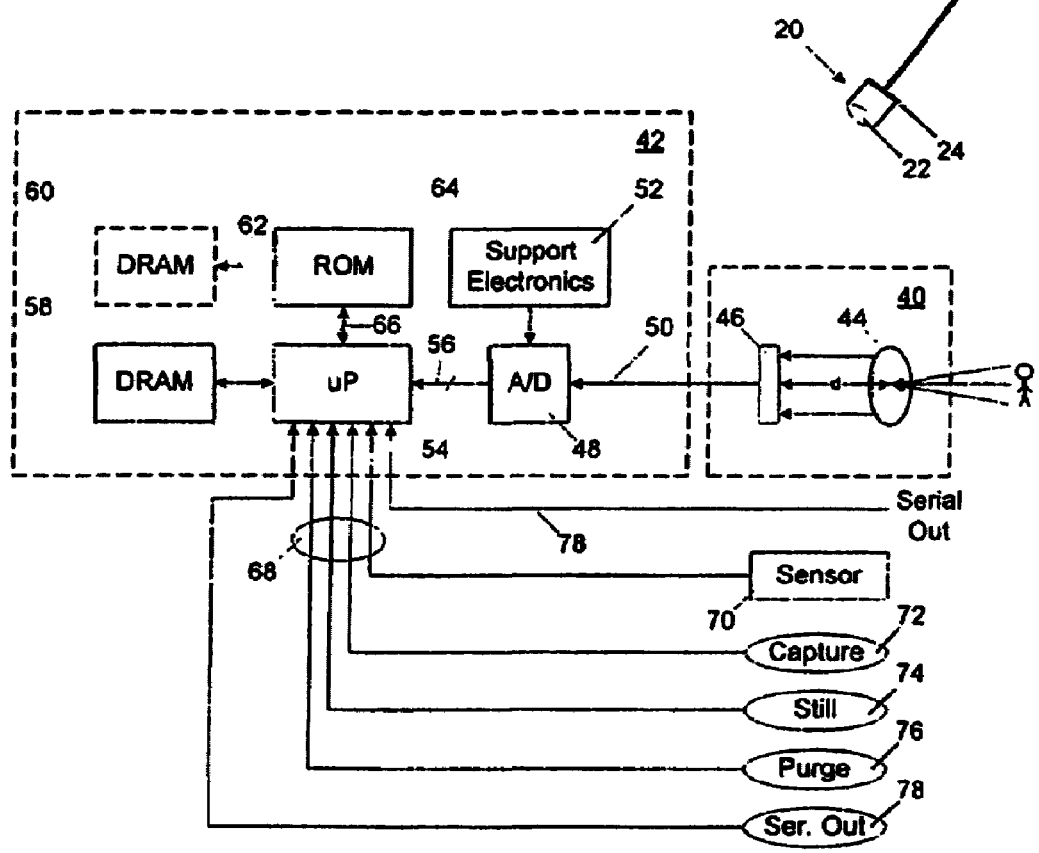
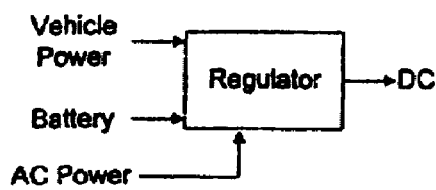
Fig. 3

VIDEO RECORDING DEVICE RESPONSIVE TO TRIGGERING EVENT

GOVERNMENTAL RIGHTS

Not Applicable

RELATED APPLICATIONS

Not Applicable

BACKGROUND OF THE INVENTION

The present invention relates to video recording devices and more particularly to a video camera which stores successive frames in at least one circular buffer memory and which may continue to store frames for a period following the occurrence of a triggering event.

Numerous applications exist in which it is desirable to retain a video record for evidentiary or historical purposes. For example, in an automobile, or on a bicycle or motorcycle, it would be desirable to record a video image of the circumstances existing immediately prior to an accident and after an accident. Additionally, in security applications, it would be highly desirable to be able to record a video image of the circumstances existing immediately prior to an event triggering an alert condition and following the triggering of such a condition. Additionally, in numerous other applications it would be desirable to be able to create a video record of circumstances existing both before and after a triggering event.

A number of image recording devices are well known in the art. In time lapse photography a series of still pictures are taken over a period of time. Such pictures are typically taken with a periodically actuated still or a motion picture camera and employ photographic film. The cameras are loaded with a limited supply of film and the camera must be reloaded when the supply of film is exhausted. Accordingly, such devices are not well suited for applications in which it is desired to record images over a long period of time when only a very short period of time is of interest and the particular period of interest cannot be predicted.

In security applications, a video camera is often employed to record a video image on magnetic tape on a continuous basis. When the tape is exhausted it must be replaced.

Both photographic cameras employing photographic film and video cameras utilizing magnetic tape as the recording media employ mechanical transport mechanisms which are susceptible to failure when subjected to shock and vibration. Accordingly, such devices are ill suited for use in applications and environments in which shock and vibration are the norm.

For the above reasons, a video recording device would be desirable which could record video frames on a continuing basis and capture a video record of circumstances surrounding a triggering event occurring at an unpredictable time. It would further be desirable for such a device to be compact, lightweight, cost effective and avoid the aforementioned deficiencies of prior art video recording devices employing mechanical transports.

SUMMARY OF THE INVENTION

In accordance with the present invention, a video recording device is disclosed which is contained within a compactly sized housing. One or more video image sensors are mounted to the housing. Alternatively, one or more video image sensors are provided which are electrically coupled to the housing via wires so as to permit the image viewing area to be selected freely via suitable mounting of the sensors by a user. The video recording device records video frames successively in at least one circular buffer memory organized as a continuous loop overwriting the oldest frame within the respective buffer memory with a more recently received frame. Upon receipt of a triggering event, a predetermined number of additional frames are recorded within the circular buffer memory at which point recording ceases. A plurality of circular memory buffer groups may be provided to extend the overall recording time for the device by selectively storing video data samples to the respective buffer groups. The foregoing video recording device can be fabricated as a compact transportable unit which employs no moving parts and which has relatively low power consumption facilitating battery operation in certain embodiments.

More specifically, a video camera is provided which comprises a lens and a video image sensor. The lens is employed to focus a video image on a video image sensor such as a charge coupled device sensor or an artificial retina as hereinafter discussed. The output of the video image sensor comprises an analog signal which is coupled to one or more A/D converters. The A/D converter(s) is sampled to generate a digital representation of the video image sensor analog output signal. A predetermined number of digital samples comprise one video frame. The digitized output signal(s) from the A/D converter(s) is coupled to a central controller in the form of a microprocessor or any other suitable controller. The microprocessor compresses the digitized frame data and stores the compressed frame data in the next sequential location of the circular buffer. In one embodiment, the digitized frame data is encrypted prior to storing the same in the buffer so as to prevent unauthorized access to such data. The circular frame buffer comprises a semiconductor memory such as DRAM or any other suitable high speed semiconductor memory.

Upon detection of a trigger event, the video recording device records a predetermined number of additional frames and then ceases to record further frame data. In this manner, a video event record is obtained which commences prior to the triggering event and extends in time after the triggering event. Triggering events may include an accelerometer output signal crossing a predetermined threshold, a signal employed to initiate air bag deployment in an automobile, a signal representing a recognized change in a video image or acoustic signal, a signal indicative of a security or fire alarm condition, a button actuated by a user, or any other suitable activation signal known in the art. Further, an activation button is provided which permits a user to take a single frame "snap shot" which is retained within the buffer memory until purged upon user activation of a purge button.

A serial output channel is provided to permit recorded frame data to be downloaded to a computer for viewing.

The above described apparatus thus provides a video recording device which has high reliability, is compact, cost effective and suitable both for consumer and commercial applications.

BRIEF DESCRIPTION OF THE DRAWINGS

The invention will be more fully understood by reference to the following Detailed Description of the Invention in conjunction with the drawings of which:

FIG. 2a is a pictorial view of a housing for a video recording device in accordance with the present invention in which a camera comprising a lens and image sensor is mounted within the housing;

FIG. 2b is a pictorial view of an alternative embodiment of a housing for the video recording device of FIG. 1 in which the camera is disposed external to the housing and in electrical communication with video processing circuity (not shown) disposed within the housing;

FIG. 3 is an electrical block diagram of a video recording device in accordance with the present invention;

FIG. 7 is a table illustrating an alternative storage technique for storage of video data in the semiconductor memory buffer; and FIG. 8 is a table illustrating a further alternative storage technique for storage of video data in the semiconductor memory buffer.

DETAILED DESCRIPTION OF THE INVENTION

Figure 1:
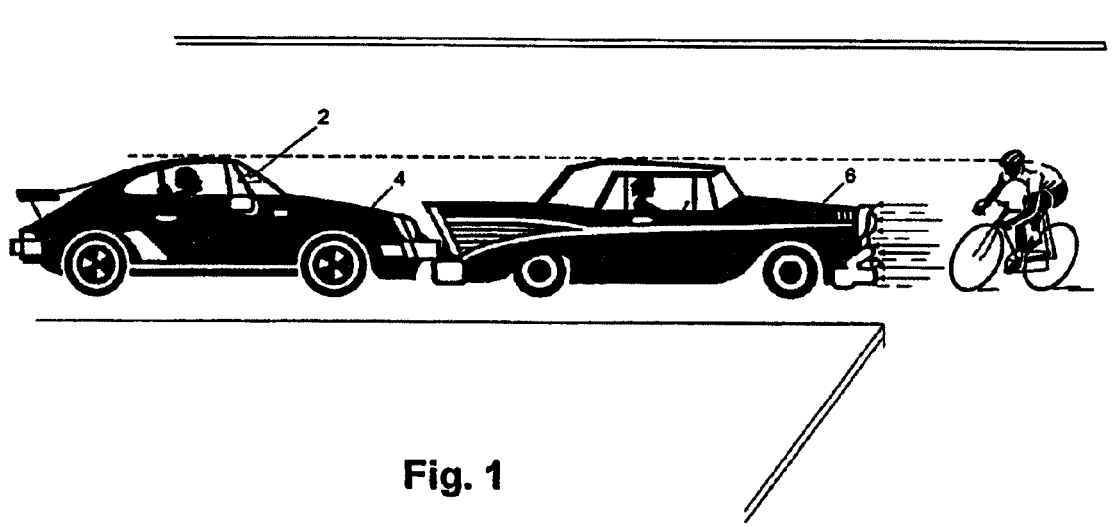
FIG. 1 is a pictorial view illustrating an application for use of the video recording device of the present invention.

An application of a video recording device 2 in accordance with the present invention is illustrated in FIG. 1. The recording device 2 is mounted within a first vehicle 4 which has come to a stop behind a second vehicle 6 at an intersection. Vehicle 6 has also come to a stop at the intersection, however, has backed up so as to impact vehicle 2 causing damage to vehicle 4. It would be highly desirable for the driver of vehicle 4 to have an evidentiary record which establishes that the accident was caused by vehicle 6 since it would normally be presumed in such a circumstance that the driver of vehicle 4 was the cause of the accident. The video recording device 2 in accordance with the present invention generates such a record by continually recording video frames in a circular buffer at a predetermined frame rate. In response to a trigger event, such as an air bag activation signal or a button activated by the driver, the video recording device records a predetermined number of additional frames before ceasing to record further frames. In the foregoing manner, the driver of vehicle 4 can establish the true cause of the accident. The foregoing example is provided solely as an illustration of the operation of the video recording device 2 of the present invention.

A housing 10 for a video recording device 2 in accordance with the present invention is depicted in FIG. 2a. The housing 10 includes a camera comprising a lens 12 and a video image sensor (not shown) which may comprise a charge coupled device (CCD), an artificial retina, or any other suitable optical sensor operative to provide output signals when a video image impinges the sensor. By way of illustration, the sensor may comprise a model TC241 CCD array manufactured by Texas Instruments or an artificial retina such as identified and described volume 372, number 197 NATURE, 1994 which is incorporated herein by reference. The lens 12 is specified to have appropriate optical characteristics and is oriented so as to focus a video image of the desired field of view on the video image sensor. While the housing of FIG. 2a illustrates the use of a single camera, multiple cameras may be employed and selectively oriented to capture images at desired viewing angles. For example, one camera may be positioned at the forward edge 14 of the housing 10 and a second camera at the trailing edge 16 of the housing 10 to capture images at 180° viewing angles. Additionally, by way of example, cameras may be disposed on the leading edge 14 and a side edge 17 of the housing 10 so as to capture video images along orthogonal viewing angles. It is further understood that any desired number of cameras may be employed.

Another embodiment of a video recording device assembly in accordance with the present invention is depicted in FIG. 2b. The video recording device illustrated in FIG. 2b includes a housing 18 and a camera 20 which is disposed external to the housing 18. The lens 22 focuses a video image on the sensor 24 which, in the preferred embodiment, produces an electrical output signal for communication to a video signal processor. The sensor 24 communicates the electrical output signal via wires 26 to the video signal processor disposed within the housing 18. The wires 26 may be coupled to the circuitry (not shown) via a connector or alternatively may be hardwired to such circuitry. While a single video image sensor 20 is depicted in FIG. 2b, as with respect to FIG. 2a, the video recording device in accordance with the present invention may employ multiple cameras 20 which may be selectively mounted and positioned at desired viewing angles so as to permit a corresponding number of video images to be captured.

The housings illustrated in FIGS. 2a and 2b may be fabricated in a PCMCIA configuration with a PCMCIA connector disposed at one end so as to permit the housing to be inserted into a laptop computer or any other suitable computer having a PCMCIA interface to permit viewing of images captured within the video recording device.

A block diagram of the video recording device in accordance with the present invention is depicted in FIG. 3. As illustrated in FIG. 3, the recording device includes a camera 40 and video electronics 42. The camera 40 is comprised of a lens 44 which is disposed a predetermined distance d from the surface of an image sensor 46. The image sensor 46, as described above, may comprise a charge couple device array, an artificial retina, or any other suitable image sensor operative to provide an output signal representative of a video image which impinges upon the sensor. In a preferred embodiment employing a CCD array as the sensor 46, the CCD array produces an analog output signal which in electrically coupled to an analog to digital converter 48 via a signal path 50. The analog to digital converter may comprise a model AD775 A to D converter manufactured by Analog Devices, Inc. or any other suitable analog to digital converter. Support electronics 52 are provided which include a clock generator which is coupled to the analog to digital converter 48 to permit the sensor output 50 to be sampled at predetermined intervals and other conventional timing circuitry. The analog to digital convertor 48 generates a digital representation of the sensor output signal 50. A predetermined number of samples of the sensor output signal 50 comprise a single video frame. For example, in one exemplary embodiment, each frame contains 256 horizontal samples by 128 vertical samples yielding an uncompressed size of 32,768 bytes. Sixty four such frames can be stored in a two (2) megabyte memory.

Generally, color images require approximately thirty (30) percent more storage space. One could thus store approximately fifty (50) frames of uncompressed color image information in the two (2) megabyte memory.

For images of the above identified sizes a compression ratio of four to one (4:1) is readily achievable. Such would permit 256 black and white images or 200 color images to be stored in the two (2) megabyte memory. At a recording rate of ten (10) frames per second, the two (2) megabyte memory will accommodate thus accommodate 25 seconds of black and white images or 20 seconds of color images. A greater recording interval may be achieved by employing a lower sampling rate or by utilizing a larger memory.

The output of the analog to digital converter is electrically coupled to inputs of a central control processor 54 via signal path 56 which comprises a parallel signal bus. The central control processor 54 in a preferred embodiment, may comprise an M32RD microprocessor which is commercially available from Mitsubishi Electric, any other suitable microprocessor, an Application Specific Integrated Circuit (ASIC) or any other suitable implementation of a central control processor operative to perform the presently described functions.

The central control processor 54 is coupled to a semiconductor memory 58 which comprises a DRAM a in preferred embodiment. Within the M32RD device referenced above, two (2) megabytes of DRAM is incorporated in the commercially available device. Thus the microprocessor 54 and the DRAM 58 may be obtained as a single integrated circuit. Additional semiconductor memory 60 may be coupled to the microprocessor 54 via a bus 62 in the event that it is desired to increase the semiconductor memory capacity of the video recording device. It may be desired to increase the memory capacity of the recording device to permit a greater number of frames to be captured or to accommodate the storage of video images received from plural cameras.

The central control processor 54 executes a control program which is stored within a Read Only Memory (ROM). The ROM 64 is coupled to the central control processor via bus 66. The central control processor 54 is provided with a number of inputs 68 which permit activation of the video recording device and control of the device by a user. Exemplary inputs comprise, an event sensor 70, a "capture" button 72, a "still" button 74 and a "purge" button 76. Additionally, the central control processor 54 includes a serial output channel 78 which permits stored video images to be downloaded to an external video device for viewing. In one embodiment, the serial output channel is compatible with the well known Xmodem serial protocol. It is appreciated that any suitable serial channel protocol may be employed.

The central control processor 54 receives successive samples of frame data from the analog to digital converter 48 and compresses the received frame data in order to reduce the storage capacity for the captured video data. One image compression technique which may be employed is disclosed in U.S. Pat. No. 4,917,812 to Adelson and Simoncelli. While any suitable compression technique may be employed, in a preferred embodiment of the invention, an asymmetric compression technique (known in the art) is used which minimizes the computational load on the central control processor to compress the image data during compression of the image data at the expense of greater complexity in the decompression algorithm. The use of an asymmetric compression technique thus places greater processing demands on the processor which will ultimately perform the decompression which, is likely to comprise a personal computer (PC), a workstation, or some other computer which generally possesses the necessary processing speed to perform such decompression or which is not burdened by the constraint of real time processing. In this manner, the video electronics 42 are not burdened with additional cost associated with added processing power.

Figure 4A:
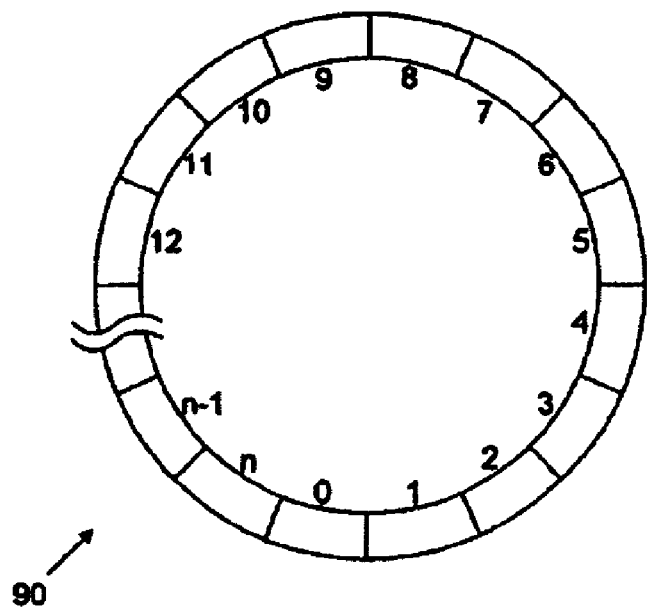
FIG. 4a is a simplified schematic representation of a circular memory buffer employed within the video recording device of FIG. 3.

Following the compression of the frame data, the central control processor stores the compressed data within the semiconductor memory 58. The semiconductor memory 58 is structured as a circular memory buffer as illustrated in FIG. 4a. Thus, following compression, each compressed video frame is stored in the next successive frame buffer location and any frame data contained in such location is overwritten. For example, referring to FIG. 4a, if the last frame were stored at location 3 of the circular buffer 90, the subsequent video frame would be stored at location 4 of the circular frame buffer. The video recording device, absent receipt of some trigger event from the sensor 54 or activation of other input by the user, continues to store captured frame data in successive locations of the circular buffer, overwriting previously received frame data stored in respective buffer locations with the most recently received frame data.

Figure 4B:
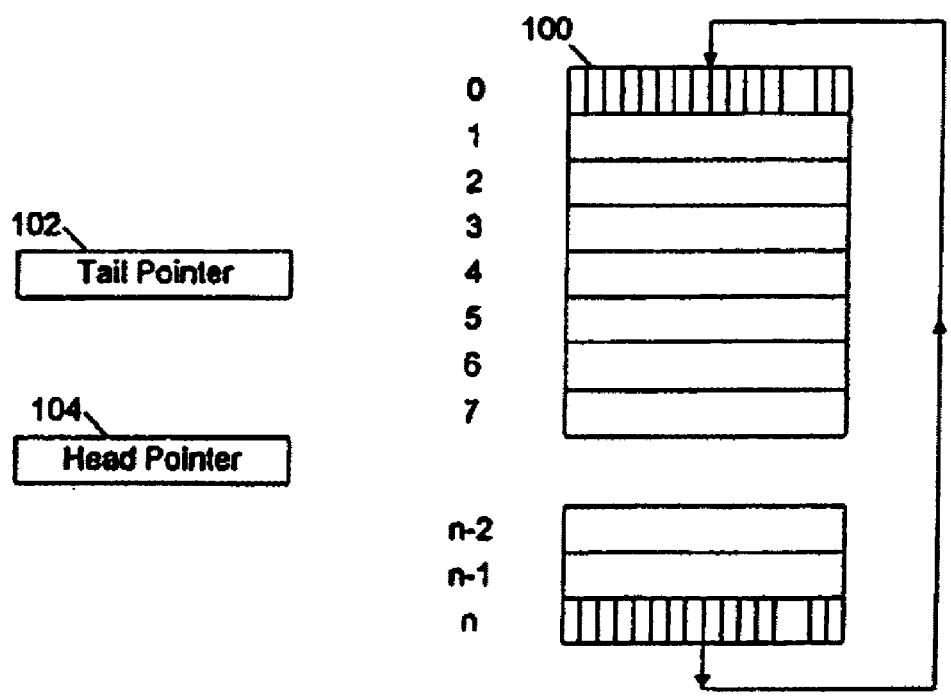
FIG. 4b is a representation of a semiconductor memory buffer employed in the video recording device of FIG. 3 to implement a circular memory buffer and associated head and tail pointers.

The operation of the circular buffer is described with more particularity below and with respect to FIG. 4b. The semiconductor memory buffer is sized to as to permit the desired number of frames to be concurrently stored in the buffer. The buffer 100 utilizes a plurality of bytes to store each frame as illustrated in frame buffer locations 0 and n. The specific number of bytes required for a particular frame is dependent upon the resolution of the video image sensor 46, the sampling rate of the analog to digital converter 48, and the efficiency of the compression algorithm.

Associated with the semiconductor memory buffer 58 (and additional buffer memory 60 if such is employed) are a tail pointer 102 and a head pointer 104. The head pointer points to the address of the frame buffer location for storage of the next frame data. Such address is offset in the respective frame to address the respective byte for the frame data being stored. For simplicity, the operation of the buffer is explained with respect to the frame addresses recognizing that plural locations are utilized within the buffer to store the data associated with any given frame.

The head pointer 104 points to the location for storage of the incoming frame data. Thus, if the next frame data is to be stored in location 4, the head pointer is set to location 4. Once all of the data corresponding to frame 4 has been stored in the buffer, in normal operation and in the absence of a trigger event, the head pointer is incremented to point to frame number 5. As an example, assume a semiconductor memory buffer 58 is employed in which n=127; i.e. the frame buffer is capable of storing 128 frames of data. It is further assumed for purposes of the present example that it is desired to have half of the captured frames precede the trigger event and half of the frames follow the trigger event. The head pointer 104 is incremented following the storing of each respective frame. In normal operation, the tail pointer is incremented each time the head pointer is incremented, however, the tail pointer comprises an address which lags the head pointer by sixty four. In the circular buffer frame address 0 follows frame address n (i.e. 127 in the present example).

Upon detection of a trigger event, the tail pointer ceases to increment while frames continue to be stored in subsequent frame locations. A test is performed prior to storing frame data to determine whether the frame location for the data to be stored is one location preceding the tail pointer in which case the frame data pertaining to that frame is stored. No subsequent frames are stored in the frame buffer. Thus, following the trigger event, the buffer contains frame data commencing at a location z and ending at a location z−1; i.e. if the tail pointer stopped incrementing upon detection of a trigger event when pointing to address 6, the last captured video image would be stored in location 5 and further image capture and storage would cease.

The sensor 54 may comprise any sensor which provides a trigger output signal in response to a condition which is desired to initiate the capture of the video image or images occurring prior to and following the occurrence of the trigger output signal, For example, the sensor may comprise an accelerometer, an air bag deployment sensor of the type normally used in automobiles to initiate the deployment of an air-bag, a security or fire alarm alert condition sensor used to detect movement, glass breakage, unauthorized entry such as found in a burglar alarm for example fire or smoke, an acoustic signal characteristic of a specific event such as gunshots, or any other signal indicative of a specified event. Moreover, while a single sensor 70 is illustrated for simplicity, it should be appreciated that plural sensors may be employed to activate the capture of video images by the present video recording device and that video image capture may be initiated by any one of such sensors or a combination of such sensors.

Upon detection of a trigger event from the sensor 70, the central control processor 54 receives only a predetermined number of additional frames and stores such frames in the semiconductor memory 58 in the successive frame locations within the circular buffer 90. Following the recording of the predetermined number of additional frames, the video recording devices ceases to record further frame data. Thus, if the central controller is programmed to record half the number of frames which are capable of being stored within the semiconductor memory 58 or 58 and 60, as applicable, the video frame data stored within the circular buffer corresponds to an equal number of video frames captured prior to the trigger event and after the trigger event. It is appreciated that any desired percentage of frames may be captured prior to or after the trigger event by specifying how many frames are to be captured and stored after the trigger event.

In one preferred embodiment, it is envisioned that the semiconductor memory will support the storage of 5 frames of video data per second for approximately 30 seconds. Thus, the memory will support the storage of approximately 150 video frames. If it is desired to record the same number of frames before and after detection of a trigger event from sensor 70, seventy five additional frames would be recorded and stored in the circular buffer 90 subsequent to the detection of the trigger event. It should be appreciated that the number of frames that are recorded before and after are a matter of design choice, the only limitation being that the total number of frames to be recorded not exceed the frame capacity of the semiconductor memory. Thus, in the above example in which the video electronics include DRAM supporting storage of 150 video frames, if it was desired to obtain a record which provided ten percent of the frame data prior to the trigger event and ninety percent of the frame data following the trigger event, an additional 135 frames would be recorded and stored subsequent to the trigger event.

Referring again to FIG. 3, the video electronics 42 and sensor 46 are powered by a DC regulator which may derive input power from an AC source, when such is available, from a vehicle battery, or from batteries such as AA cells or any other suitable batteries. When powered by a vehicle battery, it is recognized that in the event of an accident or in some cases, when the vehicle is turned off, the vehicle battery power may cease to provide power. In such event, the battery cells provide an alternative source of power to permit the buffers 58 and 60 to be periodically refreshed (should DRAMs be employed), Since the refresh current is extremely low for DRAMs, the data captured within the buffer may be maintained for many weeks before the captured video data is lost. It is estimated that two or four AA cells will support full operation of the video recording device for between two and five hours of recording operation thus permitting fully portable operation of the unit on, for example, a bicycle or in any other application in a steady source of power is not readily available, at a minimal cost in added weight. It is also estimated that two (2) to (4) AA battery cells will maintain the contents within memory for between one (1) and (4) months.

The video recording device is provided with a capture button 72 which serves as a user activatable trigger event. Thus, a user of the device may initiate video capture by pushing the capture button 72. Upon activation of the capture button, a trigger signal is provided to an detected by the central control processor 54. The operation of the video electronics 42 upon user activation of the capture button 72 is otherwise as described with respect to the occurrence of a trigger event in response to a trigger signal provided by the sensor 70.

The still button 74 is optionally provided and coupled to the central control processor 54. Upon activation of the still button, the video electronics captures a video frame and stores the frame within the buffer memory 58 or the extended buffer memory 60. In one embodiment, a frame which is stored as a result of the activation of the still button 74 is stored in a protected memory buffer area which is not employed as a part of the circular buffer 90. In another embodiment of the video recording device, the captured frame is stored within a frame location within the circular buffer, however, the frame is protected from overwriting while video capture within the circular buffer continues. Such may be accomplished via tagging protected frame locations containing captured still frames and checking to determine whether a frame location is protected prior to writing to the frame location. Alternatively, a "still" frame may be stored at the upper, lower or some other designated portion end of the circular buffer and the head and tail pointers controlled so as not to result in the overwriting of the "still" frame.

The purge button 76 is optionally provided and is electronically coupled to the central control processor 54. Upon activation of the purge button, the contents of the circular buffer and any still images that have been captured are erased. Thus, in the event that a user captures images which, for any reason, such user does not desire to retain, they may be erased.

In one embodiment of the invention, the captured digital data is encrypted with any suitable encryption algorithm prior to storing the captured frame data in the buffer memory. The encryption of the captured frame data assures that such data cannot be accessed without authority of the user.

The serial channel 78 is employed to download captured and stored video images to an external Personal Computer (PC), Workstation or other suitable device for viewing of the recorded images. Alternatively, the serial channel may be coupled to a radio transmitter to transmit RF signals to a base station for viewing. By way of example, upon detection of gunshots as a trigger event, and storage the specified number of frames within the circular frame buffer, the trigger event is used to cause the transmission of captured video data to a base station over an associated RF transmitter such as found in a police cruiser. The serial channel 78 may comprise a channel compliant with the well known Xmodem protocol, or any other suitable serial channel protocol, for example when the video recording device is employed in a home or another location in which AC power is employed, the serial channel may be appropriately coupled to the AC power line employing the well known X10 protocol for receipt and viewing by a device having an X10 protocol compliant receiver.

An electronic or tamper-evident mechanical seal may be optionally provided to assure that the information contained in the video recording device has not been tampered with prior to viewing to assure the evidentiary integrity of the captured images. The electronic seal may comprise encryption of the video data such that only an individual with authorization may view the recorded data. The mechanical tamper seal may be in the form of a paper or similar seal which is positioned on the case so to as to require rippage of the seal in the event the housing 10, 18 has been opened or if cable connections have been exposed.

The frame rate of video capture may be optionally varied so as to provide a higher frame capture rate or a lower frame capture rate upon the occurrence of a trigger event. The inclusion of an adaptive frame capture rate permits higher or lower frequency rates to be employed in particular applications in which such might be desirable. Additionally, the resolution may be varied so as to provide a different resolution in response to a trigger event. For example, upon recognition of a trigger event, the recording device may record at a higher or lower resolution than that employed prior to the trigger event. Further, an exponential change in resolution may be employed. Finally, the change in resolution may be delayed for a predetermined number of frames following the trigger event.

Figure 6:
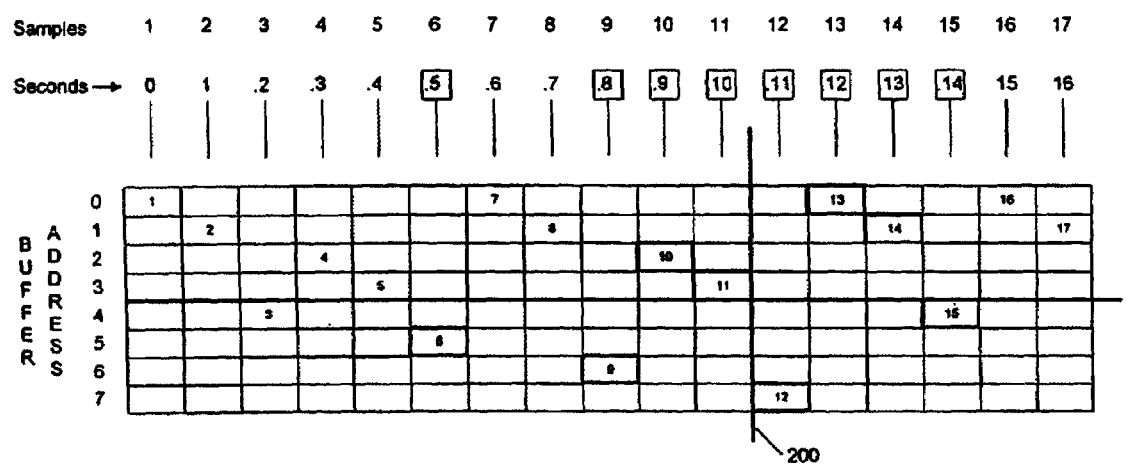
FIG. 6 is a table illustrating one storage technique for storage of video data in the semiconductor memory buffer.
Figure 7:
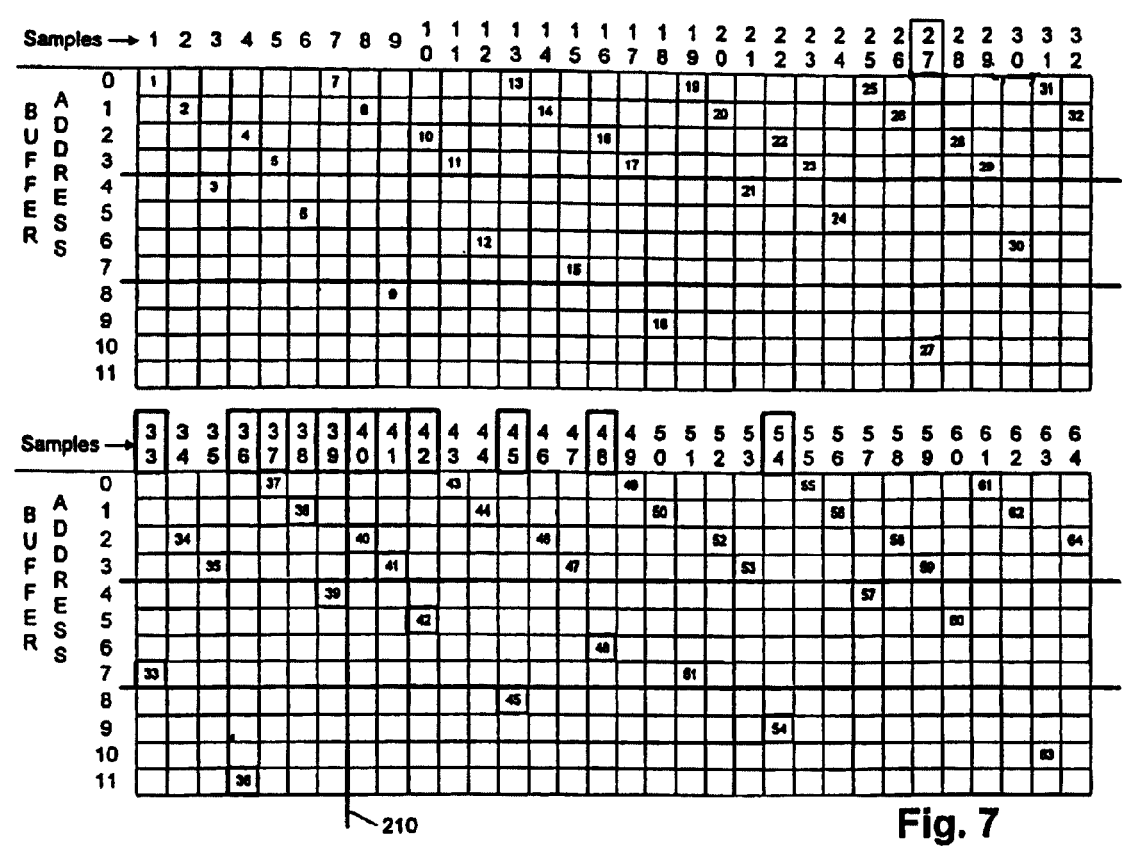
Figure 8:
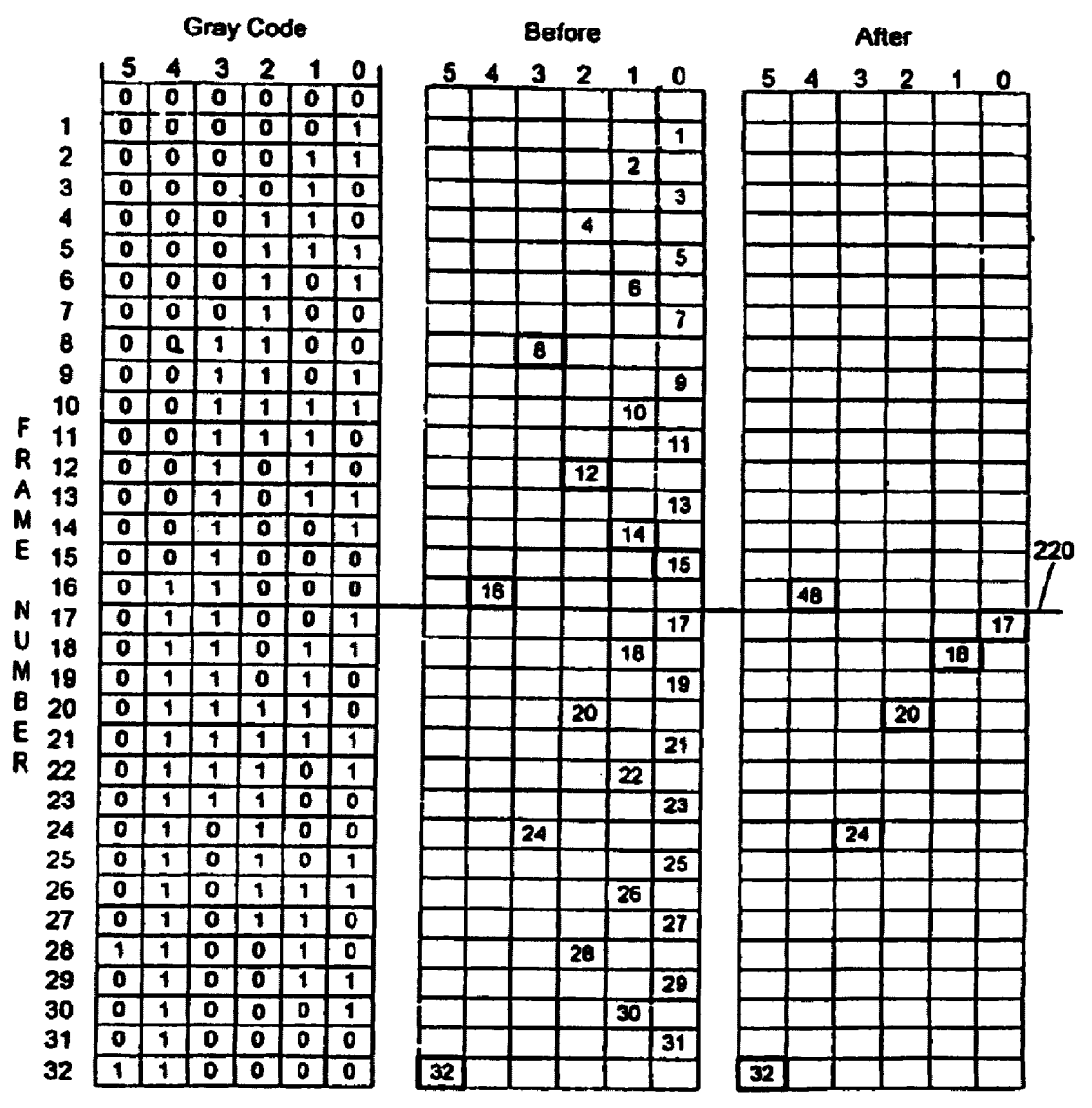

For example, video data may be stored in the memory buffer using different storage techniques to achieve desired objectives. It may be desired to have higher frame storage rates around the trigger event with successively lower effective storage rates as one progresses further in time away from the trigger event (both before and after the event). It is appreciated that any number of storage methods may be employed via selective addressing of the semiconductor memory to extend the period of time captured within the semiconductor memory buffer, or to achieve almost any frame capture profile that may be desired. Several storage techniques illustrated in FIGS. 6 through 8 are discussed below.

An automatic gain control (AGC) (not shown) may optionally be electronically coupled between the video image sensor 46 and the A/D converter 50 to compensate for variations in light intensity and to prevent blooming of the captured video image.

Figure 5:
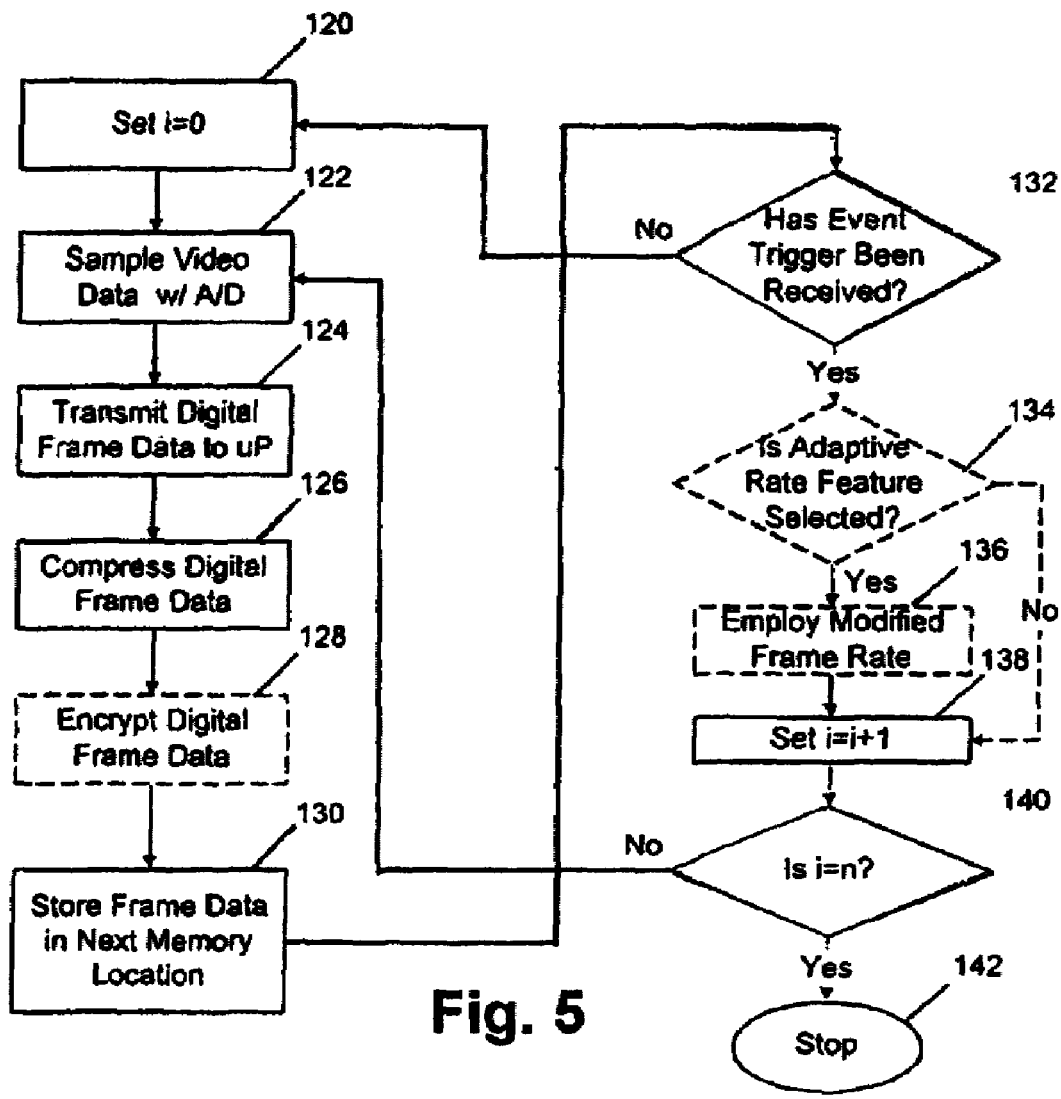
FIG. 5 is a flowchart illustrating the recording method in accordance with the present invention.

The basic method of operation of the video recording device illustrated in the block diagram of FIG. 3 and described above is illustrated in the flow diagram depicted in FIG. 5. As depicted in step 120 in FIG. 5, upon initialization, a counter value i is initialized to 0. As illustrated in step 122, the video data corresponding to a video frame is sampled by the A/D converter and converted to digital data. As shown in step 124, the converted frame data is transmitted to the microprocessor. Upon receipt of the frame data, as illustrated in step 126, the microprocessor compresses the frame data so as to permit a greater number of frames to be stored within the circular buffer memory than would otherwise be possible absent such compression. Additionally, as depicted in step 128, the frame data may optionally be encrypted by the microprocessor to prevent unauthorized access to such data. As shown in step 130, the frame data is stored in the next frame location within the circular memory buffer. In the event that any video data has previously been written to the specified memory location within the circular buffer, such data is overwritten. As illustrated in decision step 132, a determination is made whether an event trigger has been received. If no event trigger is received, the counter i is reinitialized to 0 and sampling and storage of frame data continues. If the decision step 132 results in a determination that a trigger event has been received, as illustrated in decision step 134, a determination is optionally made whether adaptive rate selection is employed. In the event that adaptive rate selection is employed, the sampling rate of the A/D converter is adjusted as depicted in step 136 and the modified frame rate is employed for subsequent frame storage. In the event that adaptive rate selection is not employed or enabled, following step 132 control passes to step 138 in which the counter i is incremented. As shown in decision step 140, a determination is next made as to whether the counter is equal to the specified number of frames to be recorded subsequent to the occurrence of a trigger event. In the event that the determination reveals that the specified number of frames has not been recorded subsequent to the trigger event, control passes to step 122 and sampling continues. In the event the determination of step 140 reveals that the predetermined number of frames have been captured subsequent to the trigger event, control passes to step 142 and further frame capture ceases.

If frames are simply received and stored in successive locations of a circular buffer, it is apparent that the total record time will equal the number of frames allocated in the buffer for storage minus one times the frame sampling period. Thus, assuming a semiconductor memory which can hold 150 video frames and a ten (10) frame per second storage rate, the semiconductor memory will only be able to hold 14.9 seconds of video data. If the trigger is adjusted so as to provide for approximately one half of the frames to be recorded prior to the trigger event and one half of the frames subsequent to the trigger event, it is evident that only approximately 7.5 seconds of record time is achieved surrounding the event of interest.

FIGS. 6 through 8 illustrate several frame storage techniques which provide for storage of video information over a greater period of time than is achieved by simply storing each successive frame in a successive buffer location as discussed hereinabove wherein the entire buffer pool is treated as a single circular buffer.

The table depicted in FIG. 6 illustrates data samples received successively at 0.1 second intervals. For simplicity, eight data storage buffers having buffer addresses 0–7 are illustrated although typically many more data buffers would be employed. The data buffers are segregated into two groups of buffers with buffers having addresses 0–3 comprising a first buffer group and buffer having addresses 4–7 comprising a second buffer group. Each group is organized as a circular buffer in which a data sample is stored in the first storage location within the respective group following storage of data sample within the last storage location of the group.

A data sample is stored in the next location within the second group following storage of a predetermined number of data samples within the first group of storage buffers.

In normal operation and in the absence of the occurrence of a trigger event samples are stored as illustrated in FIG. 6. More specifically, the first sample is stored in address 0 of the first group of buffers and the second sample is stored in address 1 of the first group of storage buffers. Following the storage of two data samples in the first group of storage buffers data sample 3 is stored in address 4 which comprises the first address in the second group of storage buffers. The next two data samples comprising samples 4 and 5 are stored in buffer addresses 2 and 3 comprising the next two successive buffer addresses within the first group of storage buffers. Sample 6 is stored in buffer address 5 which comprises the next successive buffer within the second group of storage buffers. This storage technique continues in the absence of a trigger event as illustrated for 17 data samples in FIG. 6.

Once a trigger event has been received, data storage ceases following the storage of a predetermined number of data samples ($P_n$) within each group (n) of storage buffers where n=the number of the respective buffer groups. For example, with reference to FIG. 6, a trigger event is indicated as having occurred following the receipt of data sample 11. Data storage ceases following the storage of two additional data samples in the first group of storage buffers (samples 13 and 14) and two additional samples within the second group of storage buffers (samples 12 and 15). Thus, in the simplified illustration of FIG. 6, the overall storage interval has been expanded from 0.7 seconds (8 successive samples at 0.1 second intervals) which would be obtained if all eight buffers were considered as a single buffer group to 0.9 seconds by organizing the eight buffers as two groups of buffers in which each comprises four buffers. Further, more frames are stored in the vicinity of the trigger event and fewer frames are stored for times farther away in time from the trigger event by employing the presently disclosed technique. It should further be appreciated that by employing greater numbers of groups of buffers, the time interval covered may be substantially increased while still obtaining the highest frame storage resolution immediately before and after the trigger event. Furthermore, it is possible to achieve storage of a greater number or a smaller number of frames before the trigger event or after the trigger event based upon the specification of the number of data samples that are to be stored within respective groups prior to termination of further data sample storage within the respective group.

A further example of the presently disclosed storage technique employing three groups of storage buffers, in which each group comprises four storage buffers, is illustrated in FIG. 7. As illustrated in FIG. 7, a data sample is stored in each successive group only following storage of a predetermined number of data samples within the preceding group. More specifically, the first group of storage buffers comprises buffer addresses 0 to 3, the second group of buffers comprises addresses 4 to 7 and the third group of buffers comprises buffer addresses 8 to 11. The first group of buffers comprise the highest resolution buffers since the greatest number of data samples are stored within this group. Successive groups each store fewer data samples than the preceding group. Any number of variations to the presently disclosed recording technique may be employed to obtain expansion of the time interval covered by the available number of storage buffers while maintaining high resolution recording around the trigger event. For example, while the technique illustrated in FIG. 7 provides for recording sample 9 to the first location of the third storage buffer group following storage of data samples 7 and 8 in address locations 0 and 1 respectively of the first buffer group, sample 7 could instead be stored in address 8 of the third buffer group and samples 8 and 9 could then be stored in address locations 0 and 1 of the first buffer group respectively with the storage pattern thereafter repeated in a circular manner for each of the respective buffer groups.

Referring again to the illustrated storage technique depicted in FIG. 7, a trigger event 210 is illustrated as occurring between samples 39 and 40. Subsequent to the trigger event 210, recording continues within each buffer group until the predetermined number of data samples for that group has been received and stored. In the example depicted, storage of data samples within each group ceases following receipt and storage of two data samples within each of the respective groups. There is no requirement for the number of data samples to be stored subsequent to the trigger event to be the same for each of the groups and the number of data samples stored after the trigger event may be selected so as to favor storage of information either prior to or subsequent to the trigger event for each of the storage buffer groups.

Assuming a 0.1 second sampling interval, if a single circular buffer comprising twelve buffer locations were employed without segregating buffers into groups, the interval span would constitute 1.1 seconds. In the example depicted in FIG. 7 the time span covers 2.4 seconds with only three buffer groups although the specific time span varies with the positioning of the trigger event. By increasing the number of buffer groups high resolution may still be obtained around the trigger event with even greater overall time interval coverage.

Another alternative technique for storing video data in the video recording device is illustrated in FIG. 8. A gray code generator, which in the exemplary embodiment comprises a six bit generator, is employed to generate a code in which only a single bit changes from each code to the next. The gray code generator may comprise a gray code counter implemented in hardware or alternatively, a conventional counter may be employed to address a look-up table which contains the respective gray codes and provides such codes as outputs. A buffer pool for storing video data is divided into two parts. One portion of the buffer pool (the Before column) is employed to stored video frames received prior to the trigger event 220 and a second portion of the buffer pool is employed to store video data received subsequent to the trigger event. In the example of FIG. 8, six buffers are illustrated in each portion of the buffer pool for purposes of discussion although in practice any number of buffers may be employed within the respective portions and typically the total buffer pool would include many more than 12 buffers to obtain a substantially increased recording time.

Video data is periodically stored on an ongoing basis in the absence of a trigger event, in the buffer address corresponding to the gray code bit which changed when last incremented. Thus, as illustrated, when the gray code changes from 000000 to 000001 video data corresponding to frame 1 is stored in buffer location 0 (of the Before column) since the change in the gray code occurred in bit 0 of the gray code. Similarly, when the gray code changes from 000100 to 001100, video frame 8 is written to buffer location 3 since the change in the gray code occurred in gray code bit 3. Due to the gray code addressing employed, the lowest address buffer is overwritten every other video frame. The higher the address of the buffer, the less frequent the overwriting of the respective buffer occurs. Following the storage of the video frame in the last buffer location within the first buffer portion, the sequence repeats with video frame data stored in respective buffers being rewritten with new video data.

After the gray code generator has cycled through the first buffer portion a number of times, it is assumed that a trigger event 220 occurs between frame numbers 16 and 17. Once a trigger event has been received, storage of video frame data within the first portion of the buffer pool (the Before columns) ceases and video frames then stored in the second portion of the buffer pool (the After columns) using the same addressing technique described with respect to the first portion. Several rules, however are applied with respect to writing of video frame data within the second portion of the buffer pool after the detection of a video event. Once a video frame is written to a buffer within the second portion of the buffer pool all further writes to that buffer are suppressed. Additionally, writing of video frame data to the second portion of the buffer pool ceases when the last gray code is reached which preceded the trigger event. By way of illustration, since the trigger event was detected after gray code 011000 and before gray code 011001, attempt to write to the second buffer pool would cease following the writing (or suppression of writing, as applicable) to buffer 4.

More specifically, following the trigger event 220 video frame 17 is written to buffer 0 of the second buffer pool (outlining highlighted) and video frame 18 is written to buffer 1 within the second buffer pool. Video frame 19, however, is not written to buffer 0 of the second buffer pool after the trigger event, since a video frame (frame 17) has already been written to buffer 0. Video frame 20 is written to buffer 2 (highlighted by outlining) since no prior write has occurred to buffer 2 subsequent to the trigger event 220. Writing or suppression of writing to the second buffer pool continues, as illustrated within the second buffer pool (the After columns) until the gray code is reached corresponding to the gray code immediately preceding the trigger event. In the foregoing manner the video data preceding and subsequent to the trigger event is stored for subsequent retrieval and display.

Thus, following the trigger event, and after termination of recording in the second buffer pool, frames 32, 8, 12, 14, 15 and 16 would be preserved within buffers 5, 3, 2, 1, 0 and 4 respectively of the first portion of the buffer pool and frames 17, 18, 20, 24, 32 and 16 would be preserved in buffers 0, 1, 2, 3, 5 and 4 respectively of the second portion of the buffer pool. The video frame preserved via the present storage technique in the first and second buffer pools in the present illustrative example are highlighted in bold for purposes of identification.

While the above described data storage techniques have been applied to the specific application of video data storage, it is appreciated that these described storage techniques are equally applicable to any application in which it is desired to store data received both before and after a trigger event wherein the timing of the trigger event is indeterminate.

The foregoing video recording device thus provides for the capture and recording of video images occurring both before and after a triggering event in a compact low cost assembly which employs no moving parts such as typically employed in prior art recording devices. It should be understood that modifications to the video recording device and the methods for recording herein described will be apparent to those of ordinary skill in the art without departing from the inventive concepts contained herein. Accordingly, the invention is not to be viewed as limited except by the scope and spirit of the appended claims.

What is claimed is:

1. A recording device for capturing image data, said recording device comprising: at least two memories, each of the at least two memories being organized as a circular memory for storing samples of the image data associated with a time period; and a control processor operative to selectively store some of the samples of image data in one of said at least two memories and other of the samples of image data in another of said at least two memories such that (i) each of the samples of image data is stored only once, and (ii) the stored samples of image data associated with a portion of the time period closer to an event correspond to a first resolution and the stored samples of image data associated with a portion of the time period further from said event correspond to a second resolution different than the first resolution.

2. The device of claim 1, wherein said device further comprises:
   at least one first sensor type operative to generate the data; and
   at least one second sensor type operative to generate a signal representing the event;
   wherein each image represented by the stored data associated with the portion of the time period closer to the event has the first resolution responsive to the signal.

3. The device of claim 2, wherein said at least one second sensor type includes an accelerometer.

4. The device of claim 1, further comprising:
   a capture switch;
   wherein the control processor is operative to store only a predetermined amount of data within said memory following user activation of said capture switch.

5. The device of claim 1, wherein said control processor is further operative to compress the data associated with the portion of the time period closer to the event at a first compression ratio and to compress the data associated with the portion of the time period further from the event at a second compression ratio different than the first compression ratio, prior to the storage of the data within said memory.

6. The device of claim 1, wherein said second resolution is less than said first resolution.

7. The device of claim 1, wherein said control processor is operative to store the data only in approximately one-half the memory following the event.

8. The device of claim 1, further comprising a tamper resistant housing configured to house the control processor and the memory.

9. The device of claim 8, wherein said housing is portable.

10. The device of claim 1, wherein said control processor is further operative to purge the contents of said at least one memory upon user activation of a switch.

11. The device of claim 1, wherein the first resolution is exponentially higher than the second resolution.

12. The device of claim 1, wherein the control processor is operative to encrypt the data prior to storage in the memory.

13. A recording device for capturing data, said recording device, comprising:
   at least one memory for storing image data associated with a time period;
   a control processor operative to store the data in the at least one memory, wherein each image represented by the stored data associated with a portion of the time period closer to an event has a first image resolution and each image represented by the stored data associated with a portion of the time period further from the event has a second image resolution different than the first resolution; and
   a sampler operative to sample data representing each image associated with the portion of the time period closer to the event at a first image sampling rate to generate the image data which represents each image at the first resolution and to sample data representing each image associated with the portion of the time period further from the event at a second image sampling rate to generate the image data which represents each image at the second resolution.

14. The device of claim 1, wherein the control processor is operative to store only a predetermined amount of data following the event.

15. A method for recording image data, comprising: generating samples of the image data; and selectively storing some of the generated samples of image data in a first circular memory and other of the generated samples of image data in a second circular memory, such that (i) each of the samples of image data is stored only once, and (ii) the stored samples of image data representing images associated with a time period closer to an event correspond to a first resolution and the stored samples of image data representing images associated with a time period further from said event correspond to a second resolution different than the first resolution.

16. The method of claim 15, further comprising the step of:
compressing said first data and said second data prior to storing said first data and said second data.

17. The method of claim 16, wherein said compressing is performed with an asymmetric compression routine.

18. The method of claim 16, further comprising the step of encrypting said first data and said second data prior to storing said first data and said second data.

19. The method of claim 15, further comprising the steps of:
storing said data at the second resolution prior to the event; and
storing said data at the first resolution subsequent to the event.

20. The method of claim 15, wherein said first resolution is higher than said second resolution.

21. The method of claim 15, wherein the first resolution is exponentially higher than the second resolution.

22. A method for recording data, comprising:
storing first image data associated with a time period closer to an event, wherein each image represented by the stored first image data has a first image resolution;
storing second image data associated with a time period further from said event, wherein each image represented by the stored second image data has a second image resolution different than the first resolution;
sampling data representing each image associated with the portion of the time period closer to the event at a first image data sampling rate to generate the first image data; and
sampling data representing each image associated with the portion of the time period further from the event at a second image data sampling rate to generate the second image data.

23. A compact portable device for recording image data with no moving parts, said recording device comprising: at least one first sensor type operative to generate signals corresponding to multiple images associated with a period of time; at least one second sensor type operative to generate a signal representing an event; at least two circular buffer memories for storing the image data; a control processor operative to receive said event signal and to store samples of the image data representing some of the images corresponding to the generated image signals in one of said at least two circular buffer memories and samples of the image data representing other of the images corresponding to the generated image signals in another of said at least two circular buffer memories, wherein (i) each of the samples of image data is stored only once, and (ii) the stored samples of image data representing images associated with a portion of the time period after receipt of said event signal correspond to a first resolution and the stored samples of image data representing images associated with a portion of the time prior to receipt of said event signal correspond to a second resolution different than the first resolution; a portable housing configured to house the control processor and said at least two circular buffer memories; and at least one connector disposed on said housing for outputting the stored samples of image data.

24. The device of claim 23, further comprising:
a user activated capture switch, wherein the control processor is operative to store only a predetermined amount of data within the at least one circular buffer memory following user activation of the capture switch;
a user activated purge switch, wherein the data stored in the memory is erased following user activation of the purge switch;
a user activated still switch, wherein the control processor is operative to store a single data sample following user activation of the still switch; and
at least one power source for powering the at least one first sensor type, the processor, and the at least one circular buffer memory;
wherein the housing is a tamper resistant housing and is further configured to house the at least one first sensor type.

* * * * *